(12) United States Patent
Morel

(10) Patent No.: US 6,456,661 B1
(45) Date of Patent: Sep. 24, 2002

(54) METHOD OF TRANSCODING CODED DIGITAL SIGNALS AND CORRESPONDING TRANSCODER

(75) Inventor: Anthony Morel, Saint Maur des Fosses (FR)

(73) Assignee: U.S. Phillips Corp., New York, NY (US)

( * ) Notice: Subject to any disclaimer, the term of this patent is extended or adjusted under 35 U.S.C. 154(b) by 0 days.

(21) Appl. No.: 09/436,198

(22) Filed: Nov. 8, 1999

(30) Foreign Application Priority Data

Nov. 17, 1998  (EP) .............................. 98402847

(51) Int. Cl.[7] .............................................. H04N 7/12
(52) U.S. Cl. .............................. 375/240.16; 375/240.21
(58) Field of Search .......... 375/240.01, 240.12–240.16, 375/240.24, 240.26, 240.21; H04N 7/12, 7/32

(56) References Cited

U.S. PATENT DOCUMENTS 5,729,293 A * 3/1998 Keesman ............... 375/240.15
5,870,146 A * 2/1999 Zhu ....................... 375/240.16
5,940,130 A * 8/1999 Nilsson et al. .......... 375/240.12
6,028,639 A * 2/2000 Bhatt et al. ............. 375/240.16
6,081,295 A * 6/2000 Adolph et al. .......... 375/240.16
6,215,824 B1 * 4/2001 Assuncao ............... 375/240.26
6,259,741 B1 * 7/2001 Chen et al. ............. 375/240.26

FOREIGN PATENT DOCUMENTS

EP        0690392       6/1995
WO     WO9819460      5/1998   ............ H04N/7/26

OTHER PUBLICATIONS

"Transcoder Architectures for Video Coding", by N. Bjork et al, IEEE Transactions on Consumer Electronics, vol. 44, No. 1, Feb. 1998, pp. 88–98.

* cited by examiner

*Primary Examiner*—Richard Lee
(74) *Attorney, Agent, or Firm*—Russell Gross

(57) ABSTRACT

By inserting a downsampling filter between the decoding and re-encoding parts of a transcoder, a reduced resolution transcoding is performed. Before transferring the decoded motion vectors to the encoding part, the motion vectors are processed by additional operations provided in order to take into account the fact that macroblocks before and after the resizing step no longer match.

2 Claims, 2 Drawing Sheets

METHOD OF TRANSCODING CODED DIGITAL SIGNALS AND CORRESPONDING TRANSCODER

FIELD OF THE INVENTION

The present invention relates to a method of transcoding an incoming coded video signal corresponding to a sequence of pictures subdivided into sub-pictures, which method comprises in series the steps of:

A) decoding said incoming coded signal;

B) downsampling filtering said decoded signal;

C) re-encoding said filtered decoded signal motion vectors respectively associated to said sub-pictures being transferred from the decoding side to the re-encoding one in order to be re-used during said re-encoding step and said transferring step including scaling and refining operations. The invention also relates to a corresponding transcoder. This invention may be used particularly for transcoding MPEG-2 video bitstreams to lower bit rates, when horizontal subsampling of pictures is used.

BACKGROUND OF THE INVENTION

A transcoder is a system that allows to convert a previously compressed video bitstream into another bit rate video bitstream, i.e., in fact, to re-encode a coded video sequence with a new set of parameters $P_2$ with respect to a first one $P_1$ (the set of parameters of the original coded video sequence). The complexity of a transcoder is rather low compared to a conventional cascade of a decoder and an encoder, but the quality of the transcoded sequences is generally close to the quality of the original sequences by comparison with the situation when these ones are encoded by a stand-alone coder with parameters P2.

It is known, indeed, that a pre-encoded video stream carries some useful information such as picture types, motion vectors, quantization stepsizes, bit allocation statistics, and so on. It may then be shown, for instance in the European patent application EP 0690392 (PHF94001 CEP) that, on the basis of this already available information, the complexity of the transcoder may be further reduced. For instance, a bit rate transcoder allows to adjust the bit rate of a sequence down to the channel capacity by re-computing quantizer steps to match a targeted output bit rate, the complexity being reduced because the GOP (Group Of Pictures) structure and the motion vectors remain unchanged. Moreover, the pictures need not to be completely decoded, which allows to use a single motion-compensated loop.

It may also be interesting to modify other coding parameters. For instance, by reducing the number of points per coded line (format transcoding), less picture data have to be encoded for a given bit rate. As a consequence, more bits can be spent to encode these data, and the distorsion (i.e. the compression loss) is reduced. In the following description, it has been chosen to focus on a 3:2 horizontal subsampling (from 720 picture elements to 480 for instance), as a tradeoff between resolution loss and compression loss, but other ratios are obviously possible between the horizontal sizes of pictures before and after the subsampling operation.

With such a subsampling, the decoding and encoding parts of the transcoder cannot use the same motion vectors, since input and output macroblocks (each of 16×16 picture elements in the description) do not match, as shown in FIG. 1 for a 3:2 horizontal resizing (shown in the second line with respect to the first one showing the original macroblock aspect ratio observed in the input bit stream) and for a 4:3 horizontal resizing (shown in the third line). A motion estimation is therefore required. The document "Transcoder architectures for video coding", by N. Björk and al., IEEE Transactions on Consumer Electronics, vol.44, n°1, February 1998, pp.88–98, proposes, for an estimation of that kind, a solution according to which a final output vector is obtained from four vectors (corresponding to four macroblocks) that are, after their extraction, mapped to a single one using an averaging or median filtering step (or simply a picking step: one out of four). The resulting vector is then scaled, by means of a division by two in both horizontal and vertical directions, and refined in order to optimize the match between the macroblock to be predicted and the motion-compensated prediction.

SUMMARY OF THE INVENTION

It is then an object of the invention to propose an improved motion estimator leading to more precise motion vectors without any increase of the hardware complexity.

To this end the invention relates to a method such as described in the preamble of the description and which is moreover characterized in that said transferring step comprises in series the following operations:

a) the scaling operation is applied to all the decoded motion vectors available at the decoding side, according to a scaling vector that is in direct relation with the resolution reduction of the downsampling filtering step;

b) among said scaled motion vectors, an extraction operation of a set of N motion vectors corresponding to N decoded sub-pictures whose area covers the downsampled picture area to be re-encoded;

c) the refinement operation;

d) a selection operation of a vector, according to a criterior such as the lowest mean absolute error.

The international patent application WO 98/19460 indeed describes a transcoding method and a transcoder in which are provided both means for implementing a change in resolution and, simultaneously, means for transferring from the input decoder to the output encoder adapted motion vectors, being in that case the result of scaling and refining operations. However said processing is not so precise as the present one.

BRIEF DESCRIPTION OF THE DRAWINGS

The advantages of the invention will now be explained in a more detailed manner in relation with the following description and the accompanying drawings, in which.

DETAILED DESCRIPTION OF THE INVENTION

Figure 2:
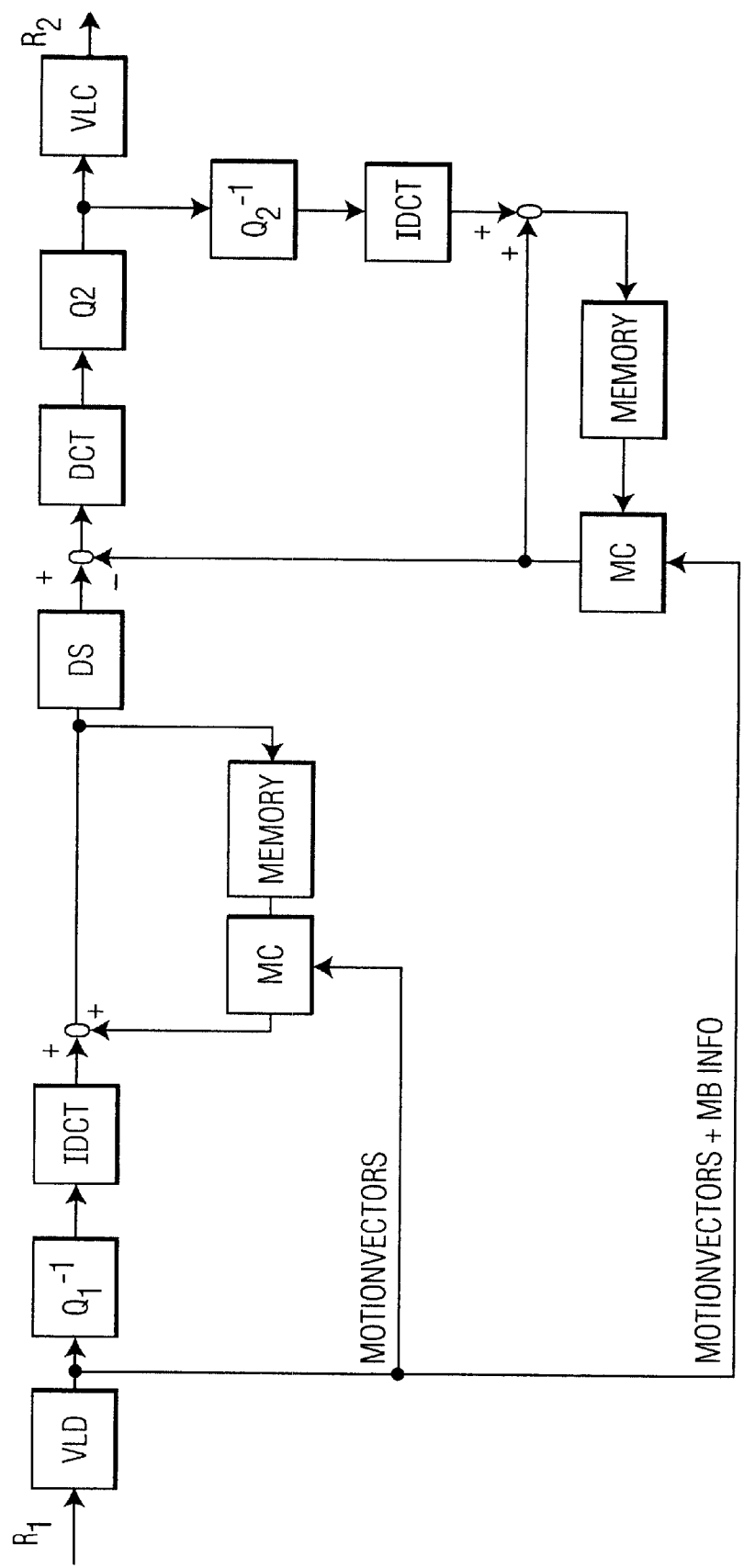
FIG. 2 depicts a transcoder including a downsampling filter.

As described in the document IEEE-TCE already cited, a resolution reduction may be carried out by means of a downsampling filter inserted between the decoding and encoding parts of the transcoder. Such a conventional implementation, illustrated in FIG. 2 of the present patent application, is explained in said document, considered as incorporated to said patent application. When inserting such a downsampling filter, it occurs that input and output macroblocks no longer match. Consequently, while it is generally considered that using the extracted motion vectors from the incoming video stream for the outgoing one is almost as good as performing a new motion estimation, these motion vectors available in the decoding part of the transcoder can no longer be used directly by the motion compensation sub-system of the encoding part.

Figure 3:
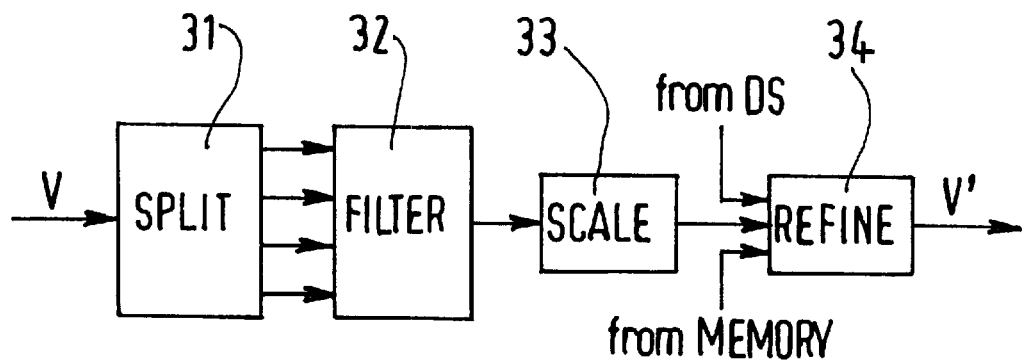
FIG. 3 illustrates a motion vector estimation according to the prior art.

As also described in this document, the number of vectors is then reduced by means of an operation achieved in the following manner (in FIG. 3 illustrating this example of motion vector estimation according to the prior art, V designates the set of the four vectors that have been decoded in the decoding part and V' the final output vector obtained after the implementation of said reduction operation):

the four vectors are first extracted by a splitting circuit 31;

these vectors are then mapped to one vector in a filtering circuit 32, using averaging or median filtering, or even picking one single vector among them (which is still called filtering);

in a scaling circuit 33, the resulting vector is divided by two in both directions a refinement circuit 34 finally allows to adjust the output vector by optimizing the match between the macroblock to be predicted and the motion compensated prediction.

Figure 1:
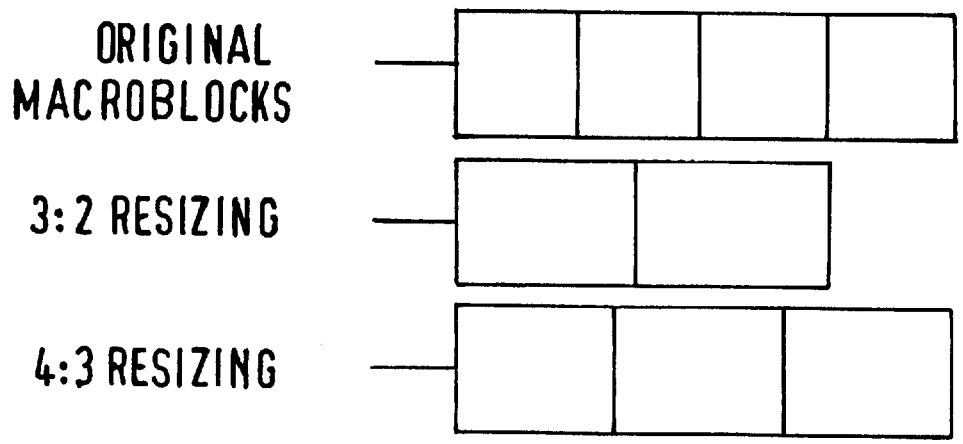
FIG. 1 illustrates in a transcoder in which pictures are horizontally resized the aspect ratio of macroblocks after 3:2 and 4:3 horizontal resizing respectively
Figure 4:
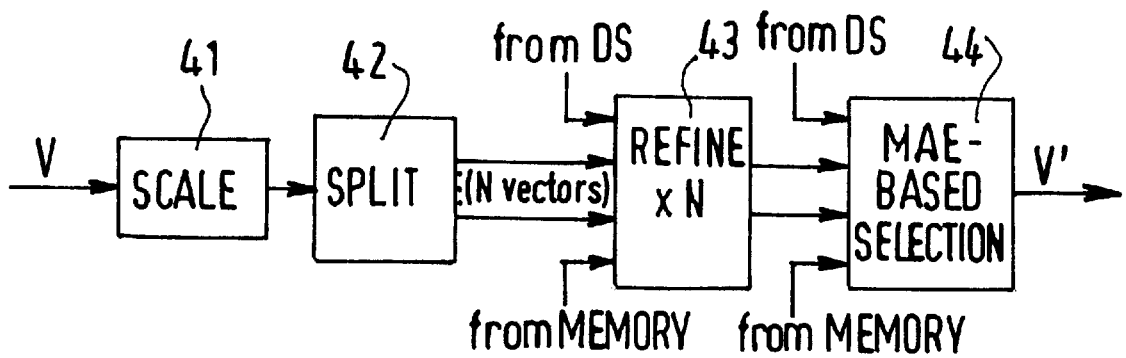
FIG. 4 illustrates a motion vector estimation according to the invention.

According to the invention, the estimation of a single vector from N decoded vectors will now be explained with reference to FIG. 4. All decoded motion vectors are first scaled (the scaling factor depending on the resolution reduction) in a scaling circuit 41. In the example of 3:2 horizontal resizing (FIG. 1, second line), three macroblocks in the input bistream correspond to two macroblocks in the output bitstream. As motion vectors need now to be specified with regard to the horizontally resized pictures, care has to be taken that new vectors do not refer to samples outside the boundary of reference pictures.

After this scaling step, N vectors of N decoded macroblocks whose area covers the downsampled picture area to be encoded are extracted by a splitting circuit 42, and then refined in a refinement circuit 43. Such a refinement may for instance consist in a (±1, ±1) block matching with pel (=picture element) accuracy in the reference frame picture (according to the MPEG-2 standard, for instance, the macroblock data may be organized in either frame or field structure), for initial vectors corresponding to the top field part and the bottom field part of macroblocks, followed by a frame vector computation and a half-pel refinement based on the two vectors previously found, and then by a half-pel refinement of the two field pel vectors found during the (±1, ±1) block matching.

An MAE-based selection (MAE=Mean Absolute Error) is finally carried out in a selection circuit 44. It comprises the following operations:

(a) for each vector, the corresponding motion-compensated prediction is formed (b) the prediction error is then computed subtracting this motion-compensated prediction from the picture macroblock to be encoded;

(c) the pixel-wise sum of the absolute prediction error (MAE) is computed, and the vector that leads to the lowest MAE is chosen.

What is claimed is:

1. A method of transcoding an incoming coded video signal corresponding to a sequence of pictures subdivided into sub-pictures, which method comprises in series the steps of:

A) decoding said incoming coded video signal;

B) downsampling filtering said decoded signal;

C) re-encoding said filtered decoded signal;

motion vectors respectively associated to said sub-pictures being transferred from the decoding side to the re-encoding side in order to be re-used during said re-encoding step and said transferring step including scaling and refining operations, said method being further characterized in that said transferring step comprises in series the following operations:

a) the scaling operation is applied to all the motion vectors available at the decoding side, according to a scaling vector that is in direct relation with the downsampling filtering step;

b) among said scaled motion vectors, an extraction operation for extracting a set of N scaled motion vectors corresponding to N decoded sub-pictures whose area covers a downsampled picture area to be re-encoded;

c) the refinement operation;

d) a selection operation of a vector, according to a criterion of a lowest mean absolute error.

2. A transcoder comprising means for decoding an incoming coded video signal corresponding to a sequence of pictures subdivided into sub-pictures, means for downsampling filtering said decoded signal, means for re-encoding said filtered decoded signal, and means for transferring motion vectors respectively associated to said sub-pictures from the decoding side to the re-encoding side in order to be re-used by said re-encoding means, said transferring means including scaling and refining stages, said transcoder being further characterized in that said transferring means comprises in series the following stages:

a) the scaling stage, that scales the motion vectors available at the decoding side, a scaling factor of said scaling stage being in direct relation with the downsampling filtering means;

b) an extraction stage that receives the scaled motion vectors and extracts a set of N scaled motion vectors corresponding to N decoded sub-pictures whose area covers adownsampled picture area to be re-encoded;

c) the refinement stage;

d) a selection stage, provided for selecting one out of said N scaled motion vectors, according to a criterion of a lowest mean absolute error.

* * * * *